Feb. 12, 1924.
C. R. SESSIONS
CENTRIFUGAL PUMP
Filed April 11, 1922
1,483,645
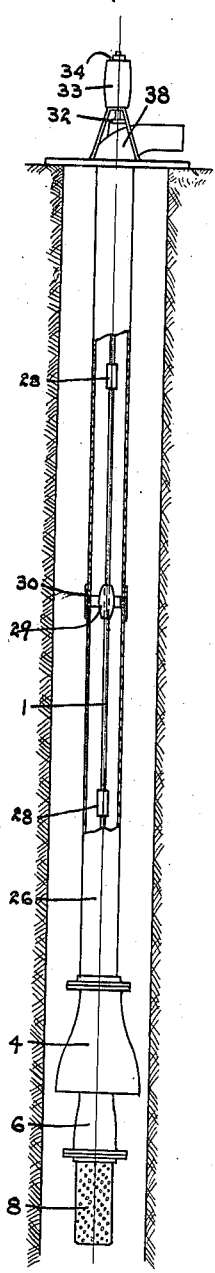
Fig. I
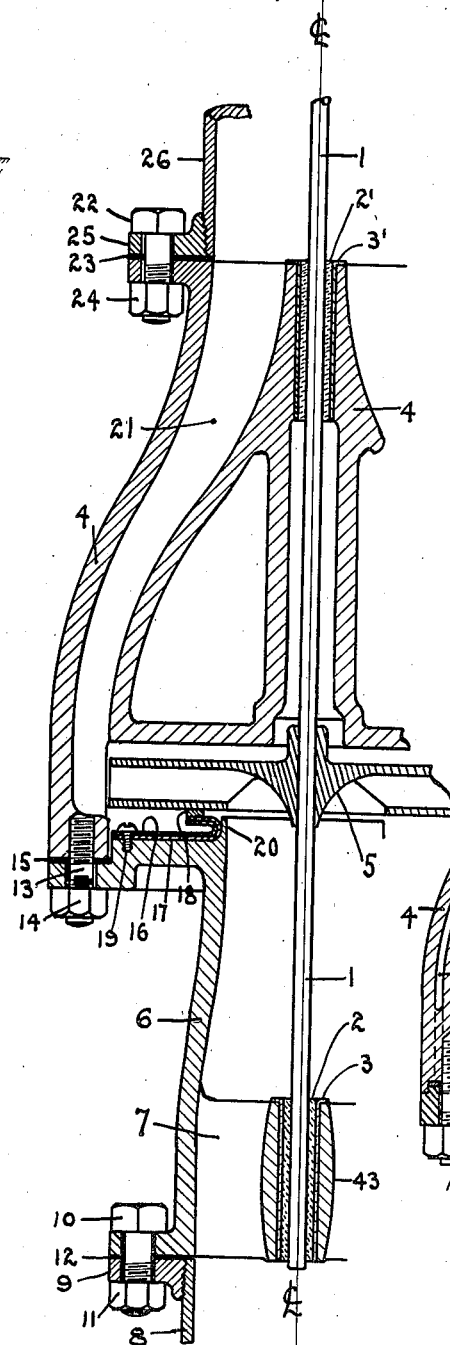
Fig. II
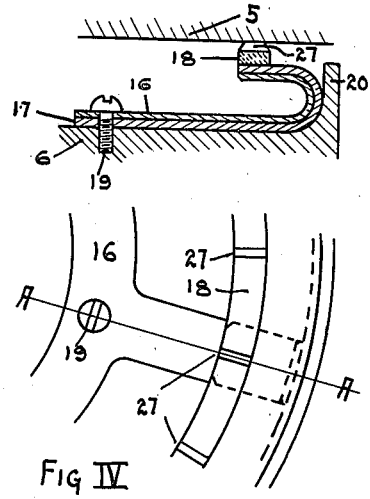
Fig. III
Fig. IV
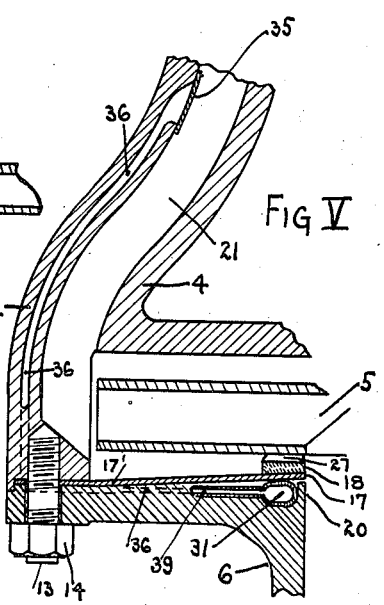
Fig. V
WITNESSES.
INVENTOR
C. R. Sessions.

Patented Feb. 12, 1924.

1,483,645

UNITED STATES PATENT OFFICE.

CHARLES ROBERT SESSIONS, OF SAN FRANCISCO, CALIFORNIA.

CENTRIFUGAL PUMP.

Application filed April 11, 1922. Serial No. 551,490.

*To all whom it may concern:*

Be it known that I, CHARLES ROBERT SESSIONS, a citizen of the United States, residing at San Francisco, California, have invented a new and useful Centrifugal Pump, of which the following is a specification.

This invention relates to a centrifugal pump suitable for high speeds and high pressures. Another object of the invention is to produce an apparatus of high efficiency and a minimum of attendance. A further object is to produce a construction easily standardized and cheaply manufactured. Other objects of the invention will appear as the description proceeds.

An embodiment of the invention is shown in the corresponding drawings in which the same reference numeral is applied to the same portion throughout, but I am aware that there may be modifications thereof.

Figure I is an elevation of a pump in a well, the column being partly cut away to show the shaft.

Fig. II is a vertical sectional view of the pump proper, the left hand half only being shown.

Fig. III is a portion of Fig. II enlarged to better show the detail of the clearance seal and is taken along the line "A—A" in Fig. IV.

Fig. IV. is a partial plan view of the detail in Fig. III.

Fig. V. is an enlarged sectional view similar to Fig. III and showing a differently constructed clearance seal.

In this invention the liquid to be pumped enters a suction piece or side plate 6, through a strainer 8 fastened to 6 by a flange 9 and bolts and nuts 10—11 and gasket 12. At the entrance to and forming a part of 6 are preferably two or three webs 7 supporting a bearing hub 43 fitted with a cylindrical shell 3 containing preferably a rubber bushing 2 supporting the shaft 1 and lubricated by the liquid which freely circulates between the shaft and bushing. The liquid passes through 6, through the impeller 5 and into the casing 4 where it is conducted between an outer and inner wall by the guide or diffusion vanes 21, into the discharge column 26. It leaves the column through the head 38 which is suitably supported at the ground level. The shaft whose exit from 38 is sealed by a suitable gland 32, is supported in a suitable radial and thrust bearing 34. The pulley 33 can be replaced with a flexible coupling suitable for direction connection to a motor, turbine, etc., not shown.

The column is fastened to the casing 4 by a flange 25, a gasket 23 and bolts and nuts 22, 24. The side plate 6 is fastened to the casing 4 by studs 13 and nut 14 and gasket 15. Shaft 1 is supported by a bushing 2' carried in a shell 3' held in a recess in the casing 4. Lubrication is accomplished by the circulation of the liquid between the shaft and the bushing 2 and caused by pressure difference along the face of the impeller. The impeller 5 has suitable vanes and is suitably fastened to the shaft 1.

The liquid is prevented from returning along the outside of the impeller by a seal piece 18 preferably of rubber and lubricated by the liquid forced through the grooves 27. In the construction as of Fig. II the seal piece 18 is fastened to and carried by a flexible diaphragm 17 which is fastened to the side plate 6 by screws 19 passing through a circular plate 16 which has radial projections extending inwardly, the ends of which are bent up, over, and outwardly to form springs to initially hold the seal piece 18 against the impeller face. When the pump is operating, an unbalanced pressure on the seal piece forces it against the impeller face. In the construction of Fig. V the seal piece 18 is fastened to and carried by a flexible diaphragm 17' which is held between 6 and 4 and serves as a gasket. Here the edge of 17' and the piece 18 are forced against the impeller face by pressure exerted in a hollow expansible ring 31 connected by a tube 39 and corresponding passages 36 in 6 and 4 to a screen or strainer 35 conveniently located at a point in the discharge passage where the kinetic energy of the liquid has largely been converted to pressure and there is least possibility of accumulated sand or grit.

The coupling 28 is preferably constructed with an internal thread (not shown) into which are screwed the shaft ends, the torsion on the shaft tending to tighten the coupling and means (not shown) fitted through the coupling at the shaft juncture to prevent the coupling unscrewing under a moderate reverse torsion.

The spider 29 is screwed into a column coupling 30 and held in place by pieces of the column 26 also screwed into the coupling.

The hub of the spider forms a bearing or control for the shaft 1. Lubrication of this bearing is accomplished by free circulation of the liquid therethrough. A control may be defined as a spider supporting a rubber bushed hub similar to the bearing already described but having considerable more clearance so that it operates only to control the shaft when it whirls.

The shaft is relatively flexible and the bearings in 4 and 6 are widely spaced so that the impeller 5 and the liquid contained in it may revolve about a varying center of mass rather than the geometrical center of construction. To allow for this so called "setting" the sealing joint is made in a plane practically perpendicular to the axis of the shaft so that the contact surface of the seal is practically motionless and the small lateral or radial movement during one revolution of points of the impeller face relative the seal surface tends to better distribute the lubricant between the surfaces. The coefficient of friction for water lubricated rubber against metal is low—probably as low as that of a good, well oil-lubricated bearing. Sand and grit have no bad effect upon such surfaces. Therefore the friction of the seal will be small and its life long. I am aware that the total pressure on the seal may be varied by varying its proportions.

In the column, shaft 1 has bearings and controls as required between the bearings in 4 and head 38. I am aware that a shaft depending upon its diameter, length, character of bearing support, coefficient of elasticity and tensile stress will have a series of critical speeds so that it is possible to so arrange construction that the operating speed will occur midway between the fundamental and second or next critical speed.

I am aware that a one stage pump only has been illustrated, but my invention is not changed if parts 26 and 25 are replaced with the lower part of another 6 with its bearing omitted and a pump of two or more stages is constructed. Also the seal 18 etc. have been shown in the drawings on only one side of the impeller. My invention is not changed if the seal is fitted on both sides of the impeller, such a construction being advisable under some conditions to lessen or remove thrust in the direction of the axis of the shaft.

A vertical deep well pump has been used to illustrate but my invention is not changed if it is applied to a horizontal single or double suction pump as are well known to those well versed in the art.

What I claim is as follows, but various modifications may be made in the construction shown in the drawings and above described form within the purview of my invention:

1. A centrifugal pump comprising a casing having an intake and a discharge port therein; a rotary impeller journaled in said casing between said intake and discharge ports; an annular diaphragm within said casing around said intake port; and resilient means on said diaphragm contacting with said impeller to prevent the passage of liquid around said impeller to said intake port.

2. A centrifugal pump comprising a casing having an intake and discharge port therein; a rotary impeller journaled in said casing between said intake and discharge port; an annular diaphragm within said casing around said intake port; resilient means on said diaphragm contacting with said impeller to prevent the passage of liquid around said impeller to said intake port; and means for exerting a pressure on said diaphragm for reducing or increasing the contact pressure on said impeller.

3. A centrifugal pump comprising a casing having an intake and discharge port therein; a rotary impeller journaled in said casing between said intake and discharge port; an annular diaphragm within said casing around said intake port; resilient means on said diaphragm contacting with said impeller to prevent the passage of liquid around said impeller to said intake port; and automatic means for exerting a pressure on said diaphragm for reducing or increasing the contact pressure on said impeller.

4. A centrifugal pump comprising a casing having an intake and discharge port therein; bearings arranged in spaced relationship in said intake and discharge port; a shaft journaled in said bearings having an impeller thereon separating said intake from said discharge port; and sealing means on said casing contacting with said impeller in a plane substantially at a right angle to said shaft to prevent the passage of liquid thereby.

5. In combination with a centrifugal pump casing, having an impeller therein, means for preventing the return of fluid between said impeller and casing, comprising, a resilient member adapted to contact with said impeller in a plane parallel with the face thereof, when said impeller is revolving about its geometrical center of construction at relatively low speed of rotation, and about its mass center at relatively high speed of rotation.

CHARLES ROBERT SESSIONS.

Witnesses:
D. R. Sessions,
C. B. Sessions.